(12) United States Patent  
Zhang et al.

(10) Patent No.: US 10,395,349 B1  
(45) Date of Patent: Aug. 27, 2019

(54) DISPLAY SYSTEM WITH TUNABLE LENS DISTORTION COMPENSATION

(71) Applicant: Apple Inc., Cupertino, CA (US)

(72) Inventors: Sheng Zhang, Milpitas, CA (US); Chaohao Wang, Cupertino, CA (US); Paolo Sacchetto, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 15/658,169

(22) Filed: Jul. 24, 2017

Related U.S. Application Data

(60) Provisional application No. 62/384,574, filed on Sep. 7, 2016.

(51) Int. Cl.  
*G06T 1/60* (2006.01)  
*G06T 5/00* (2006.01)  
*G02F 1/29* (2006.01)

(52) U.S. Cl.  
CPC ............... *G06T 5/006* (2013.01); *G02F 1/29* (2013.01); *G06T 1/60* (2013.01); *G02F 2001/294* (2013.01)

(58) Field of Classification Search  
CPC .................... G06F 3/0481; G06F 2203/04805  
USPC ......................................................... 345/647  
See application file for complete search history.

(56) References Cited

U.S. PATENT DOCUMENTS

| 7,486,341 B2 | 2/2009 | Hong et al. |
| 7,714,946 B2 | 5/2010 | Hong et al. |
| 2007/0188633 A1* | 8/2007 | Mandy .................. G06T 3/0018 348/241 |
| 2009/0154822 A1* | 6/2009 | Cabral .................... G06T 5/006 382/255 |
| 2011/0221656 A1 | 9/2011 | Haddick et al. |
| 2014/0002587 A1* | 1/2014 | Aguren ................ H04N 13/044 348/36 |
| 2015/0185503 A1* | 7/2015 | Tate ......................... G06F 3/013 351/158 |
| 2015/0187115 A1* | 7/2015 | MacDonald ............ G06F 3/013 345/419 |
| 2016/0091720 A1* | 3/2016 | Stafford ............. G02B 27/0172 345/8 |
| 2016/0116979 A1* | 4/2016 | Border .................... G06F 3/013 345/156 |
| 2016/0314564 A1* | 10/2016 | Jones ...................... G06T 15/04 |
| 2017/0131765 A1* | 5/2017 | Perek .................. G02B 5/3083 |
| 2017/0161951 A1* | 6/2017 | Fix .......................... G09G 5/00 |
| 2017/0199442 A1* | 7/2017 | Kim .......................... G02F 1/31 |

(Continued)

*Primary Examiner* — Jin Ge

(74) *Attorney, Agent, or Firm* — Treyz Law Group, P.C.; G. Victor Treyz; Michael H. Lyons

(57) ABSTRACT

An electronic device such as a head-mounted display or other display system may have a pair of adjustable focal length lenses. Control circuitry in the head-mounted display may adjust the adjustable focal length lenses so that the adjustable focal length lenses exhibit a series of different focal lengths. A graphics processor may generate undistorted image frames. The adjustable focal length lenses may exhibit a different amount of lens distortion at each focal length. To compensate for these different amounts of lens distortion, a distortion compensation circuit may predistort the undistorted image frames by an appropriate amount for each focal length. The distortion compensation circuit may include mapping and interpolation circuitry and look-up tables that store mapping and interpolation data for each of the focal lengths.

17 Claims, 4 Drawing Sheets

(56) References Cited

U.S. PATENT DOCUMENTS

2017/0206689 A1\* 7/2017 Eo .......................... G06T 3/4007
2017/0329136 A1\* 11/2017 Bates ................. G02B 27/0172

\* cited by examiner

DISPLAY SYSTEM WITH TUNABLE LENS DISTORTION COMPENSATION This application claims the benefit of provisional patent application No. 62/384,574, filed Sep. 7, 2016, which is hereby incorporated by reference herein in its entirety.

BACKGROUND

This relates generally to electronic devices with displays, and, more particularly, to systems having displays and tunable lenses.

Display systems may be used to display virtual reality content. For example, a system may have a display and a pair of tunable lenses aligned with the left and right eyes of a user. The user may view images on the display through the tunable lenses. To create an illusion of depth in the displayed images, a series of different images may be displayed as the lenses are sequentially tuned to different focal lengths. For example, distant portions of a scene may be displayed when the focal length is tuned to a long focal length setting and foreground portions of a scene may be displayed when the focal length is tuned to a short focal length setting. By adjusting focus and image content in this way, vergence-accomodation conflicts can be reduced.

Challenges may arise when using this type of device to display three-dimensional images. If care is not taken, the tunable lenses may introduce lens distortion. The lens distortion may make it difficult or impossible for the user to view satisfactory images.

SUMMARY

An electronic device such as a head-mounted display or other display system may have a pair of adjustable focal length lenses. Control circuitry in the head-mounted display may adjust the adjustable focal length lenses so that the adjustable focal length lenses exhibit a series of different focal lengths. A graphics processor may generate undistorted image frames at each of the focal lengths.

The adjustable focal length lenses may exhibit a different amount of lens distortion at each focal length. To compensate for these different amounts of lens distortion, a distortion compensation circuit may predistort undistorted image frames by an appropriate amount for each focal length.

The distortion compensation circuit may include mapping and interpolation circuitry and look-up tables that store mapping and interpolation data for each of the focal lengths.

DETAILED DESCRIPTION

Figure 1:
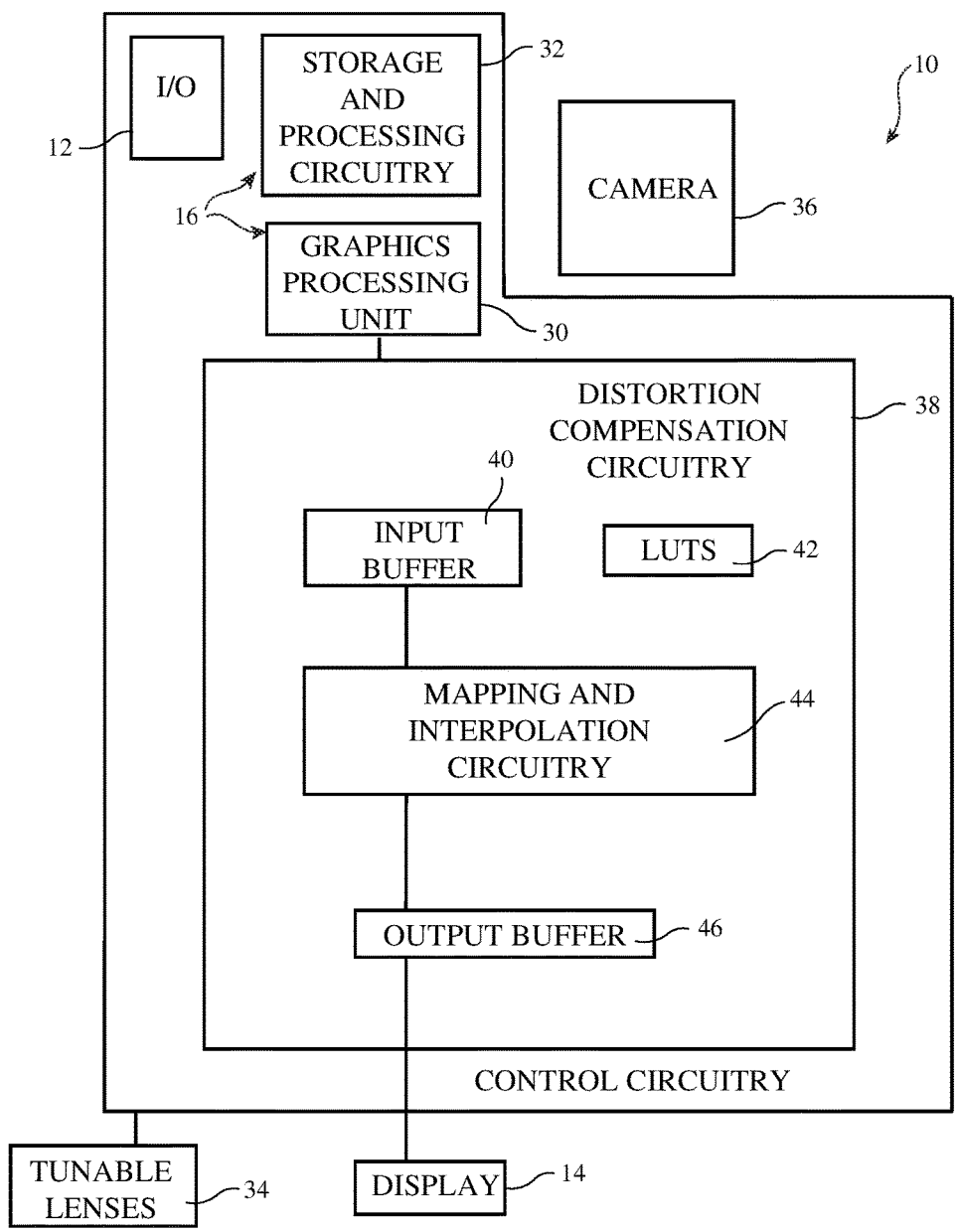
FIG. 1 is a schematic diagram of an illustrative electronic device having a display and tunable lenses in accordance with an embodiment.

An illustrative electronic device of the type that may be provided with a display is shown in FIG. 1. As shown in FIG. 1, electronic device 10 may have control circuitry 16. Control circuitry 16 may include a graphics processing unit such as graphics processing unit 30 and storage and processing circuitry 32 for supporting the operation of device 10. Graphics processing unit 30 may be used to perform image rendering operations. The circuitry of graphics processing unit 30 and of storage and processing circuitry 32 may include storage such as hard disk drive storage, non-volatile memory (e.g., electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be received by device 10 from external equipment or a user and to allow data to be provided from device 10 to external equipment or a user. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Device 10 may include one or more displays such as display 14. Tunable optical systems such as one or more tunable lenses 34 may be interposed between a viewer's eyes and display 14. Display 14 may be formed from a single array of pixels or may have left and right pixel arrays or other pixel array configurations. With one illustrative configuration, device 10 may be a head-mounted device (sometimes referred to as a head mounted display, virtual reality glasses, augmented reality glasses, head-mounted display system, etc.). Lenses 34 may be tunable liquid crystal lenses or other suitable lenses that have adjustable focal lengths. There may be a pair of lenses 34 and each lens in the pair of lenses may be aligned with a respective one of a user's eyes. The focal lengths of each of the lenses 34 may be tuned together by control circuitry 16 (e.g., both lenses may be repeatedly tuned together to each of a series of different focal lengths f1, f2, . . . fn).

A viewer may view computer-generated content (e.g., images rendered by graphics processing unit 30 for a computer game or other virtual reality content) and/or may view images of the real world that are captured in real time using camera 36. If desired, camera content and computer-generated content may be viewed simultaneously by a viewer.

When it is desired to display virtual reality content for a user, graphics processing unit 30 may display image frames corresponding to content at a series of different apparent distances from the user. In synchronization with these image frames, control circuitry 16 may direct tunable lenses 34 to tune to each of a series of focal lengths (e.g., f1, f2, . . . fn).

Tunable lenses 34 may exhibit lens distortion. To compensate for the lens distortion of lenses 34, distortion compensation circuitry 38 may predistort each image frame from graphics processing unit 30 by an appropriate amount. The predistortion applied to each image frame is configured (based on calibration information obtained by characterizing lenses 34 during manufacturing or other lens characterization information) to compensate for the expected lens distortion of lenses 34 at a different respective focal length settings. For example, a first predistortion pattern may be applied to a first image frame so that the first image frame appears undistorted when viewed through lenses 34 operating at a first focal length, a second predistortion pattern may be applied to a second image frame so that the second image frame appears undistorted when viewed through lenses 34 operating at a second focal length, etc.

Distortion compensation circuitry 38 may have input buffer 40 for receiving image data from graphics processing unit 30, storage that maintains look-up tables 42 or other data structures that define how image data should be predistorted for each associated lens focal length setting (e.g., mapping and interpolation information that specifies, for each focal length, appropriate pixel locations and weights for mapping one or more pixels in frame 50 to each corresponding pixel in frame 54), mapping and interpolation circuitry 44 that performs digital image predistortion operations on frames of image data (source pixels) in input buffer 40, and output buffer 46 for receiving the output of circuitry 44. Circuitry 38 may be implemented using a stand-alone integrated circuit, may be incorporated into a graphics processing unit or display, or may be formed using other suitable arrangements or a combination of these arrangements. If desired, circuitry 38 may be provided with information for predistorting image frames from camera 38 to compensate for the distortion imposed when viewing images from camera 38 on display 14 through lenses 34 at a given focal length setting.

Figure 2:
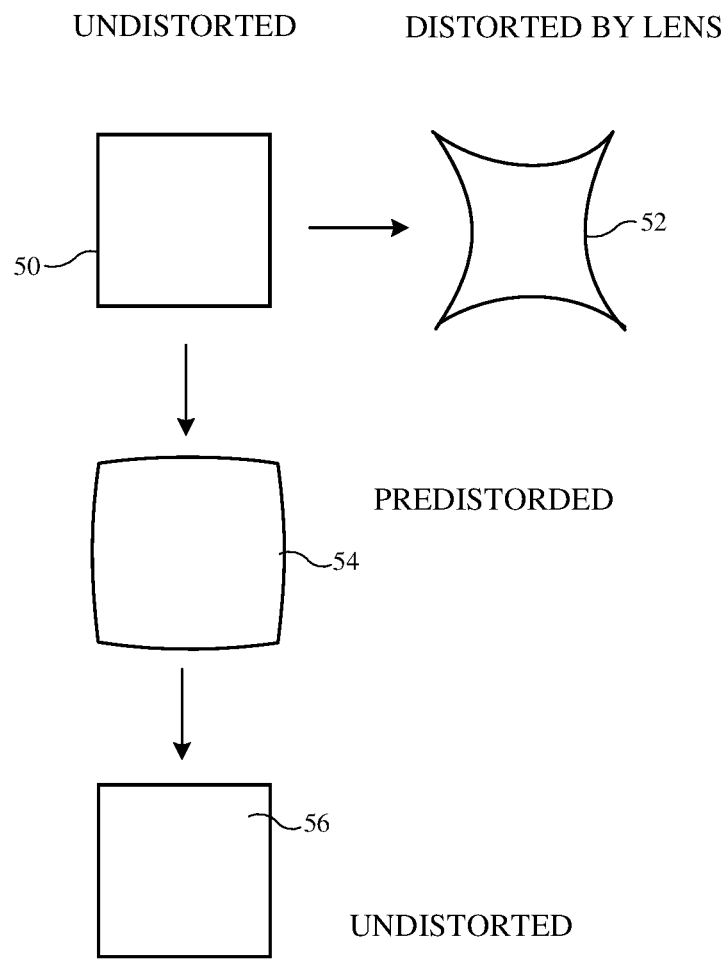
FIG. 2 is a diagram showing how digital image predistortion techniques may be used to compensate for tunable lens distortion in accordance with an embodiment.

FIG. 2 illustrates the use of predistortion to ensure that displayed images appear undistorted to the user. Display 14 may have a rectangular array of pixels. The pixels of display 14 may be organized in orthogonal rows and columns and when viewed through an ideal lens are undistorted as shown by undistorted image 60 of FIG. 2. During operation, a series of undistorted frames of image data from graphics processing unit 30 or camera 36 may be supplied to circuitry 38. If a user were to view one of these undistorted frames such as illustrative undistorted frame 50 of FIG. 2 through lenses 34, the resulting image would be distorted due to the lens distortion of lenses 34 (see, e.g., illustrative distorted image frame 52 in the example of FIG. 2). To compensate for this expected lens distortion, circuitry 38 may predistort frame 50 to produce predistorted frame 54. For example, if lenses 34 produce pincushion distortion of the type exhibited by frame 52, the predistortion operations of circuitry 38 may predistort frame 50 to produce a predistorted frame 54 with a corresponding compensating amount of barrel distortion. When predistorted frame 54 is viewed through lenses 34, the lens distortion of lenses 34 (e.g., the pincushion distortion in this example) will distort the barrel distortion of frame 54 back into an undistorted image, thereby producing undistorted image frame 56 for the user.

Figure 3:
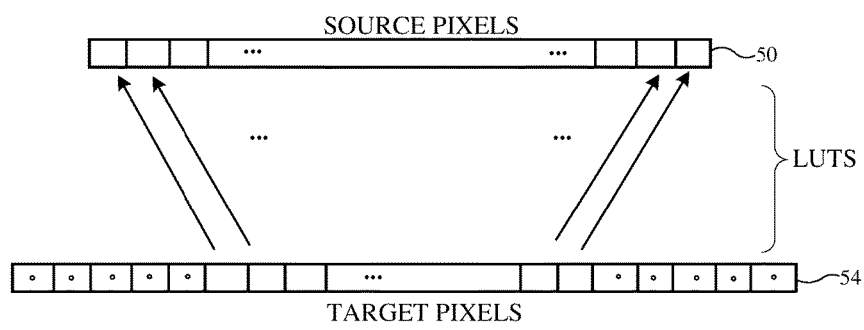
FIG. 3 is a diagram showing how distortion correction circuitry may predistort image data in accordance with an embodiment.

Mapping and interpolation circuitry 44 may be used to map source pixels associated with undistorted image frame 50 in input buffer 40 to appropriate target pixels associated with predistorted frame 54 in output buffer 46 using mapping and interpolation information in look-up tables 42, as shown in FIG. 3. Target pixels that do not correspond to source pixels in frame 50 (e.g., target pixels at the corners of illustrative barrel-distorted frame 54 of FIG. 2) may be provided with null value (e.g., logic zeros in the example of FIG. 3). The information in look-up tables 42 defines a mapping between each pixel in predistorted frame 54 and one or more pixels in undistorted frame 50. In particular, look-up tables 42 may be used to provide appropriate weights when circuitry 44 is combining one or more source pixel values from undistorted frame 50 to produce target pixels in predistorted frame 54. The look-up table weights might specify (as an example) that target pixel A in frame 54 is to be computed by summing 25% of source pixel B and 75% of source pixel C in frame 50. Because the lens distortion of lenses 34 varies as a function of focal length, the distortion information in look-up tables 42 preferably covers a range of possible focal length settings for lenses 34.

Figure 4:
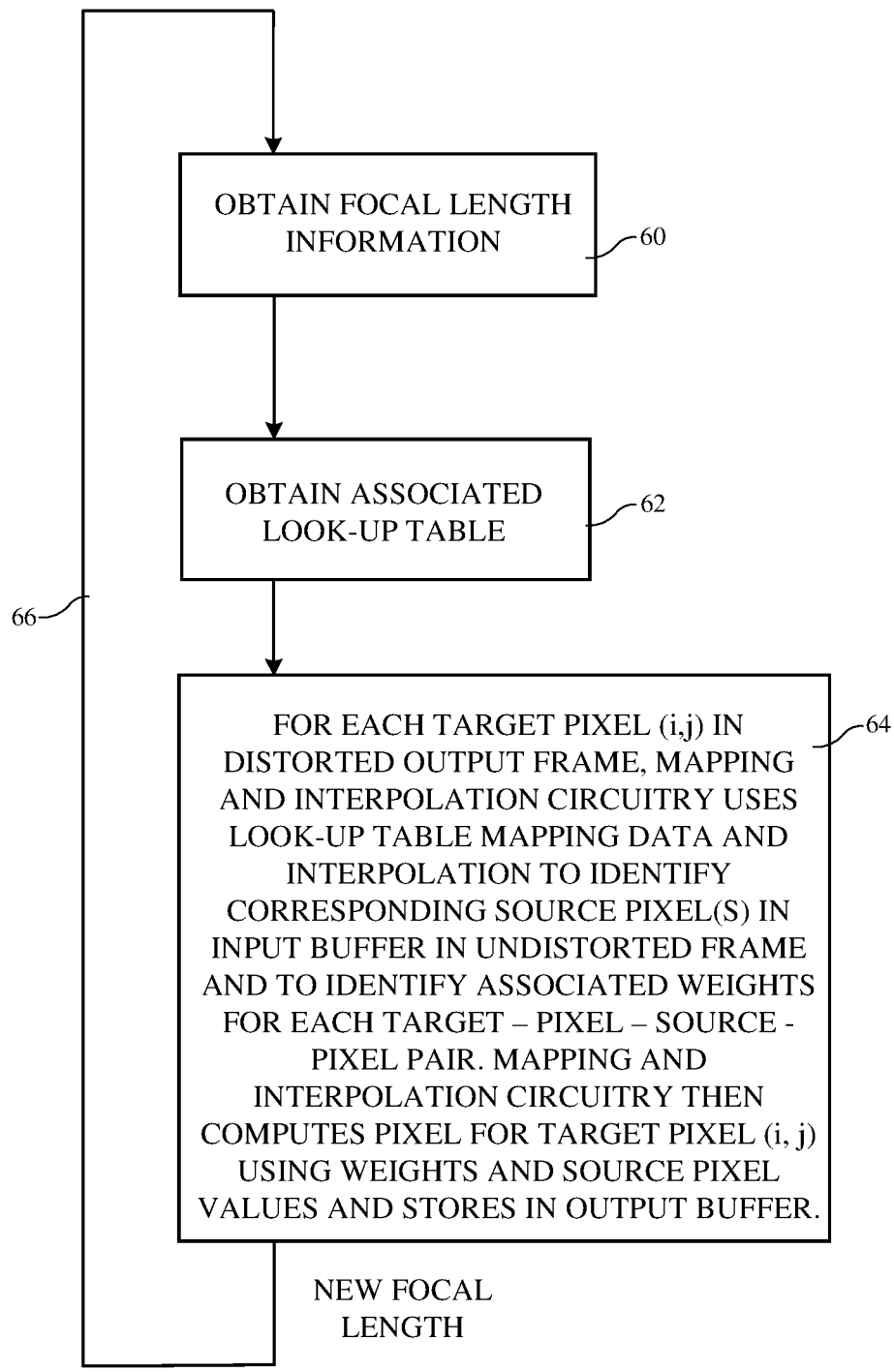
FIG. 4 is a flow chart of illustrative steps involved in operating a system such as the system of FIG. 1 in accordance with an embodiment.

A flow chart of illustrative steps involved in operating system 10 of FIG. 1 is shown in FIG. 4. During the operations of FIG. 1, control circuitry 16 may direct tunable lenses 34 to tune to a series of different focal lengths (e.g., 5-15 different focal lengths, 2-12 different focal lengths, 3-8 different focal lengths, more than 4 different focal lengths, fewer than 20 different focal lengths, etc.) at a tuning rate of 5-10 Hz, more than 4 Hz, 5-240 Hz, less than 100 Hz, or other suitable rate. Display 14 may display frames of image data at a frame rate of 120 Hz, 60-240 Hz, more than 30 Hz, less than 600 Hz, or other suitable frame rate. In configurations in which camera 36 produces image frames, lenses 34 may be set to a predetermined focal length setting suitable for viewing image frames from camera 36. In configurations in which graphics processing unit 30 is rendering image frames corresponding to different depths in a rendered scene, lenses 34 may be tuned to different focal lengths in synchronization with the different image frame depths to provide a user with virtual reality content while minimizing vergence-accomodation mismatch. As each new focal length setting is used, control circuitry 16 may provide that focal length setting to circuitry 38 and may provide input buffer 40 of circuitry 38 with pixels for a corresponding undistorted image frame 50 from graphics processing unit 30. Circuitry 38 may obtain pixels for the undistorted image frame and information on the current focal length setting from circuitry 16 during the operations of block 60. If desired, circuitry 38 may be informed of the current focal length setting for lenses 34 by synchronizing circuitry 38 and lenses 34 to a shared clock. Other techniques may also be used by circuitry 38 to obtain information on the current focal length setting for lenses 34, if desired.

After obtaining information on the current focal length setting for tunable lenses 34 during the operations of block 60, circuitry 38 may, during the operations of block 62, obtain corresponding look-up table information (sometimes referred to as pixel mapping and interpolation information) for use in mapping source pixels to target pixels, as described in connection with FIGS. 2 and 3. The mapping and interpolation information specifies how the pixels of undistorted image frame 50 should be predistorted to compensate for the lens distortion of lenses 34 at their current focal length setting.

Predistortion operations may be performed by distortion compensation circuitry 38 during the operations of block 64. In particular, for each target pixel at row i and column j of predistorted output frame 54, circuitry 44 of circuitry 38 may use the mapping and interpolation information of look-up tables 42 for the current focal length setting to identify one or more corresponding source pixels in undistorted frame 50 (stored in input buffer 40) and to identify appropriate weights (interpolation weights) to apply to each target-pixel-to-source-pixel pair (as an example, weights that indicate that a particular source pixel should be multiplied by a weighting factor of 25% and that another source pixel should be multiplied by a weighting factor of 75% before the pixel values for these source pixels are summed to produce the target pixel value). Circuitry 44 then computes the pixel value for the target pixel at row i and column j using the weights and the source pixel values for each source pixel associated with that target pixel. The target pixel values that are computed by circuitry 44 in this way during the mapping and interpolation operations of block 64 may be stored in output buffer 46 and displayed on display 14. As indicated by line 66, after an appropriate amount of image frame data has been processed (predistorted) during the operations of block 64, control circuitry 16 may direct tunable lenses 34 to tune to a new focal length and processing may continue during the operations of block 60.

The foregoing is merely illustrative and various modifications can be made to the described embodiments. The foregoing embodiments may be implemented individually or in any combination.

What is claimed is:

1. An electronic device, comprising:
    tunable lenses;
    control circuitry that is configured to tune the tunable lenses to a series of different focal lengths, wherein the tunable lenses exhibit a different respective amount of lens distortion at each of the focal lengths;
    a graphics processing unit that is configured to provide undistorted image frames each of which is associated with a respective one of the different focal lengths;
    first circuitry configured to predistort the undistorted image frames to produce predistorted image frames for each different focal length that have been predistorted by an amount that compensates for the lens distortion at that focal length; and
    a display that displays the predistorted image frames, wherein the predistorted image frames are undistorted when viewed through the tunable lenses, wherein the first circuitry comprises:
        at least one look-up table that includes mapping and interpolation information, wherein the mapping and interpolation information maps different sets of predistortion weights to be applied to the pixels of the undistorted image frames to respective focal lengths of the different focal lengths, and
        second circuitry that is configured to use the mapping and interpolation information from the at least one look-up table to predistort the undistorted image frames.

2. The electronic device defined in claim 1 wherein the first circuitry includes an input buffer that receives the undistorted frames from the graphics processing unit.

3. The electronic device defined in claim 2 wherein the first circuitry includes an output buffer that receives the predistorted image frames from the second circuitry.

4. The electronic device defined in claim 3 further comprising at least one image sensor that is configured to supply the first circuitry with image frames.

5. A head-mounted display, comprising:
    a pair of tunable liquid crystal lenses that have adjustable focal lengths, each focal length being associated with a respective lens distortion;
    a display that is configured to display predistorted image frames for viewing through the pair of tunable liquid crystal lenses; and
    first circuitry that is configured to produce the predistorted image frames by predistorting undistorted image frames for each focal length to compensate for the lens distortion at that focal length, wherein the first circuitry further comprises storage that maintains look-up tables of mapping and interpolation information for each of the focal lengths, and wherein the mapping and interpolation information maps different sets of predistortion weights to be applied to the pixels of the undistorted image frames to respective ones of the focal lengths.

6. The head-mounted display defined in claim 5 wherein the first circuitry comprises:
    an input buffer that receives the undistorted image frames;
    an output buffer; and
    second circuitry that predistorts the undistorted image frames in the input buffer and that stores corresponding predistorted image frames in the output buffer.

7. The head-mounted display defined in claim 6 further comprising at least one image sensor that is configured to provide image data that is displayed on the display.

8. The head-mounted display defined in claim 6 further comprising a graphics processing unit that is configured to supply the undistorted image frames to the first circuitry.

9. A head-mounted display, comprising:
    an adjustable focal length lens that exhibits an associated lens distortion at each of a plurality of different focal lengths;
    a display viewable through the adjustable focal length lens; and
    first circuitry configured to predistort undistorted image frames to produce predistorted image frames that compensate for the lens distortion at each of the plurality of different focal lengths, wherein the display is configured to display the predistorted image frames while the adjustable focal length lens is adjusted to each of the plurality of different focal lengths, wherein the first circuitry is configured to map source pixels associated with the undistorted image frames to target pixels associated with the predistorted image frames, wherein the predistorted image frames include a set of target pixels that do not correspond to any source pixels in the undistorted image frames.

10. The head-mounted display defined in claim 9 further comprising:
    a graphics processing unit configured to provide the undistorted image frames to the first circuitry, wherein the first circuitry includes an input buffer that receives the undistorted image frames.

11. The head-mounted display defined in claim 10 wherein the first circuitry comprises second circuitry that is configured to predistort the undistorted image frames in the input buffer to produce the predistorted image frames.

12. The head-mounted display defined in claim 11 wherein the first circuitry forms at least part of an integrated circuit that is coupled between the graphics processing unit and the display.

13. The head-mounted display defined in claim 12 wherein the first circuitry comprises an output buffer and wherein the second is configured to provide the predistorted image frames to the output buffer.

14. The head-mounted display defined in claim 13 wherein the first circuitry further comprises:
    look-up tables that include mapping and interpolation information, wherein the second circuitry is configured to use the mapping and interpolation information from the look-up tables to predistort the undistorted image frames.

15. The head-mounted display defined in claim 14 further comprising at least one image sensor coupled to the first circuitry.

16. The head-mounted display defined in claim 10 further comprising:
    control circuitry that tunes the adjustable focal length lens to each of the different focal lengths, wherein the first circuitry predistorts each undistorted image frame based at least partly on a current value for the adjustable focal length.

17. The head-mounted display defined in claim 10 wherein the first circuitry is configured to provide the set of target pixels with null values.

* * * * *